US008544255B2

(12) United States Patent
Durand

(10) Patent No.: US 8,544,255 B2
(45) Date of Patent: Oct. 1, 2013

(54) DEVICE FOR REDUCING TURBOPROP INFRARED EMISSIONS

(75) Inventor: Yves Durand, Aussonne (FR)

(73) Assignee: Airbus Operations (SAS) of Toulouse Cedex (FR)

( * ) Notice: Subject to any disclaimer, the term of this patent is extended or adjusted under 35 U.S.C. 154(b) by 498 days.

(21) Appl. No.: 12/933,217

(22) PCT Filed: Mar. 16, 2009

(86) PCT No.: PCT/FR2009/000273
§ 371 (c)(1),
(2), (4) Date: Sep. 17, 2010

(87) PCT Pub. No.: WO2009/122037
PCT Pub. Date: Oct. 8, 2009

(65) Prior Publication Data
US 2011/0016844 A1  Jan. 27, 2011

(30) Foreign Application Priority Data

Mar. 20, 2008  (FR) ...................................... 08 01538

(51) Int. Cl.
*F02C 7/08*  (2006.01)
(52) U.S. Cl.
USPC .......................................................... 60/39.5

(58) Field of Classification Search
USPC ................. 60/39.5, 264, 265, 771; 181/213, 181/215, 216, 217; 239/265.13
See application file for complete search history.

(56) References Cited

U.S. PATENT DOCUMENTS

| 3,344,882 | A | * | 10/1967 | Bellion et al. ................ 181/221 |
| 3,380,660 | A | * | 4/1968 | Markowski .............. 239/265.27 |
| 3,989,193 | A | * | 11/1976 | Vedova et al. ........... 239/265.35 |
| 4,000,610 | A | * | 1/1977 | Nash et al. ...................... 60/230 |
| 4,002,024 | A | * | 1/1977 | Nye et al. ........................ 60/262 |
| 4,018,046 | A | | 4/1977 | Hurley |
| 4,502,638 | A | | 3/1985 | Szuminski et al. |
| 4,621,769 | A | | 11/1986 | Szuminski |
| 5,699,662 | A | | 12/1997 | Born et al. |
| 6,164,563 | A | | 12/2000 | Bouiller et al. |
| 7,814,753 | B2 | * | 10/2010 | Farah et al. ..................... 60/796 |
| 7,980,508 | B1 | * | 7/2011 | Fillingham et al. .......... 244/12.5 |

* cited by examiner

*Primary Examiner* — Phutthiwat Wongwian
(74) *Attorney, Agent, or Firm* — Novak Druce Connolly Bove + Quigg LLP

(57) ABSTRACT

According to the invention, fresh air at the turboprop outlet is captured and mixed with the warm airflow created by said turboprop to lower the temperature, via a device having a tubular sleeve able to slide into the tubular duct while hot gases flow therethrough and which can switch from an inner position to a projecting position.

10 Claims, 3 Drawing Sheets

DEVICE FOR REDUCING TURBOPROP INFRARED EMISSIONS

CROSS-REFERENCE TO RELATED APPLICATIONS

This application is a §371 national stage entry of International Application No. PCT/FR2009/000273, filed Mar. 16, 2009, which claims priority to French Patent Application 0801538, filed Mar. 20, 2008, the entire contents of which are incorporated herein by reference.

FIELD OF THE INVENTION

This invention relates to a device for reducing the infrared signature of a turboprop nozzle for aircraft.

BACKGROUND OF THE INVENTION

It is known that, in some turboprops, the outlet of the hot gas flow generated by the nozzle has, within said turboprop, a duct which extends downwardly from the nozzle and through which said hot gases flow. Such duct is generally tilted at an angle of 15 to 20 degrees with respect to the horizontal and enables a portion of the residual thrust of the turboprop to be recovered.

SUMMARY OF THE INVENTION

This invention is particularly suitable for such a turboprop.

According to the invention, a device for reducing infrared emissions at the outlet of a turboprop mounted to an aircraft, said outlet having, within said turboprop, a tubular duct which extends downwardly from a nozzle of said turboprop and through which hot gases flow off said nozzle, is remarkable in that it has a tubular sleeve which is able to slide into said tubular duct while said hot gases flow therethrough and which can switch:

- from an inner position, in which said tubular sleeve is entirely accommodated inside said tubular duct,
- to a projecting position, in which said tubular sleeve projects outwardly from said tubular duct and is able to collect, in the same way as a scoop, a flow of outside fresh air in the vicinity of said turboprop and to mix said flow of outside fresh air thus collected with said hot gases flow from the turbine, in order to lower the temperature of the latter flow before it is discharged outside by said tubular sleeve.

Thus, thanks to this invention, hot gases flowing off the nozzle are diluted by outside fresh air, which enables the infrared signature of said turboprop to be reduced.

For taking in outside fresh air, said tubular sleeve has a side opening directed to the front of said aircraft and provided, in a projecting position of said tubular sleeve, in the vicinity of said turboprop. In one advantageous embodiment, said side opening results from the end of said tubular sleeve directed towards the nozzle being truncated slantwise.

In order to guide the sliding of said sleeve inside said tubular duct, it is advantageous to provide cooperating slides between these two elements.

Preferably, said tubular sleeve is removably added into said tubular duct. It is then advantageous for said inner position of the sleeve in the duct to be labelled by first latching means with automatic latching and controllable unlatching, integral with said tubular sleeve. Thus, on the ground when said turboprop is shut down, said sleeve can be loaded into said duct, through the free lower end thereof, and then it can be pushed into said duct until said first latching means automatically latch it in the inner position. On the contrary, when, during a flight, it is required to switch said sleeve from the inner position to the projecting position thereof, said first latching means are controlled to unlatch said sleeve. Therefore, it can, under the combined action of gravity and the hot gases flow generated by the nozzle, slide to said projecting position.

It is advantageous for said projecting position of the tubular sleeve to be labelled by second latching means with automatic latching, integral with said tubular duct. Thus, when said sleeve slides from the inner position to the projecting position thereof, said second latching means will latch it into the latter position. Moreover, it is preferable for said second latching means to be of the controllable unlatching type. Indeed, said sleeve can be released during a flight, in order for the aircraft to recover full aerodynamic performance, when using said sleeve is no longer required.

Preferably, both said first and said second latching means are of the electromagnet-controlled latch finger type, wherein said latch finger is elastically mounted with respect to said electromagnet.

Preferably, said first and second latching means act at said cooperating slides of the sleeve and the inner duct.

This invention further relates to a turboprop, wherein the inner duct has slides able to cooperate with the slides mounted to the tubular sleeve and/or latching means for labelling at least one of said positions of said sleeve inside said duct.

BRIEF DESCRIPTION OF THE DRAWINGS

The figures of the appended drawing will help better understand how the invention can be implemented. In these figures, identical references designate similar elements.

DETAILED DESCRIPTION

Figure 1:
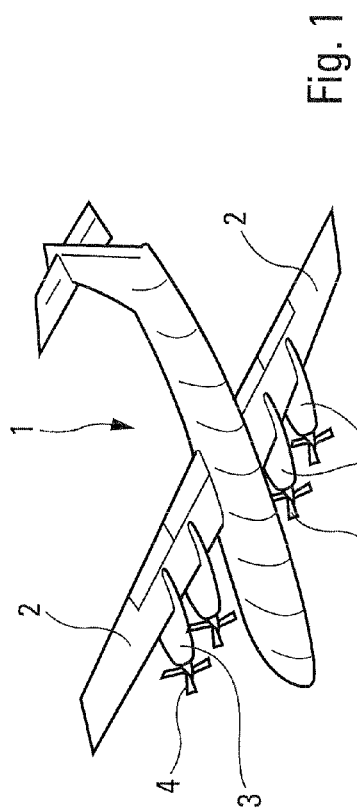
FIG. 1 schematically shows, in a perspective bottom view, an airplane provided with turboprops.

The airplane 1, schematically illustrated in a bottom perspective view on FIG. 1, has wings 2 bearing turboprops 3.

Usually (see FIG. 2), each turboprop 3 has a propeller 4 (partially illustrated on FIG. 2) and a turbine (not illustrated on FIG. 2) provided with a nozzle 5 for discharging to the outside the flow of hot gases F generated by said turbine. As shown on FIG. 2, the nozzle 5 extends outwardly through a tubular duct 6, downwardly tilted and through which said hot flow F passes. The tubular duct 6 emerges outside through the lower end 7 thereof.

Figure 2:
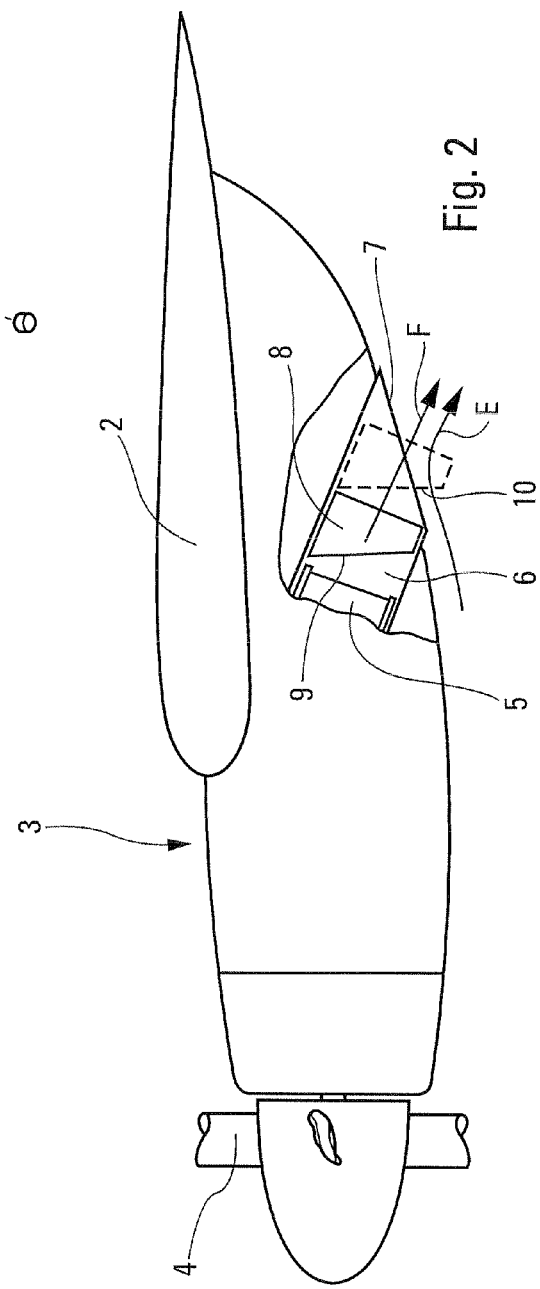
FIG. 2 schematically shows, in a partial broken view, one of the turboprops of the airplane of FIG. 1.

As schematically illustrated on FIG. 2, inside the tubular duct 6 is provided a tubular sleeve 8 (see also FIG. 3) which is able to slide into the tubular duct 6 while said hot gas flow F passes therethrough.

Figure 4:
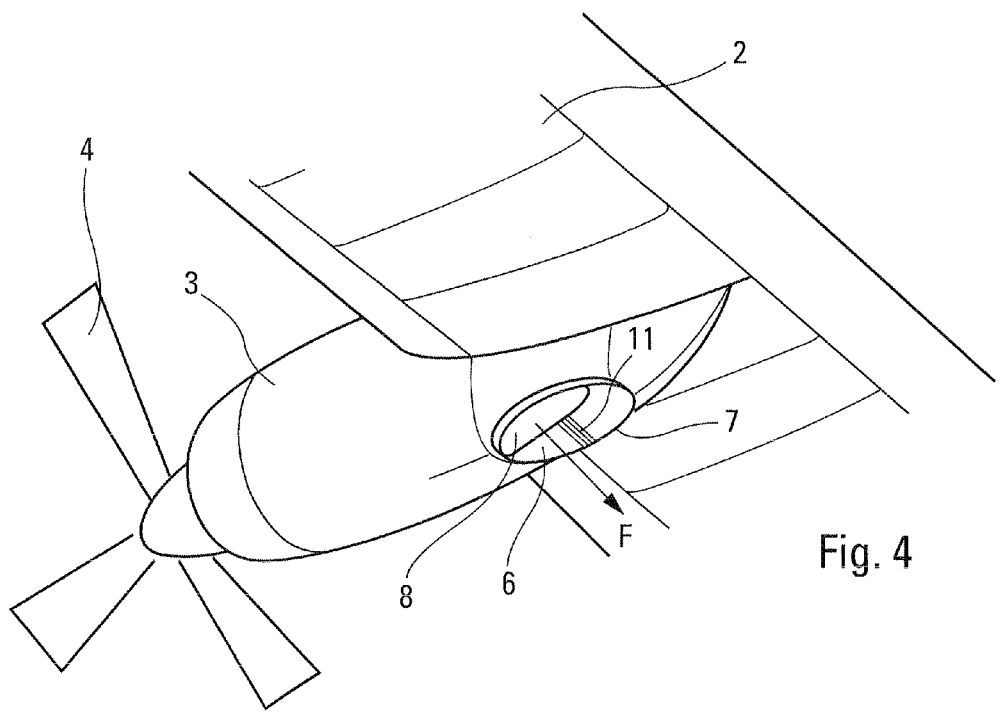
FIGS. 4 and 5 illustrate, in a partial bottom perspective view, the inner and projecting positions, respectively, of the sleeve inside one of the turboprops.

As shown in solid line on FIG. 2, the tubular sleeve 8 can assume, in the tubular duct 6, an inner position in which it is entirely accommodated inside the duct (see also FIG. 4).

Figure 5:
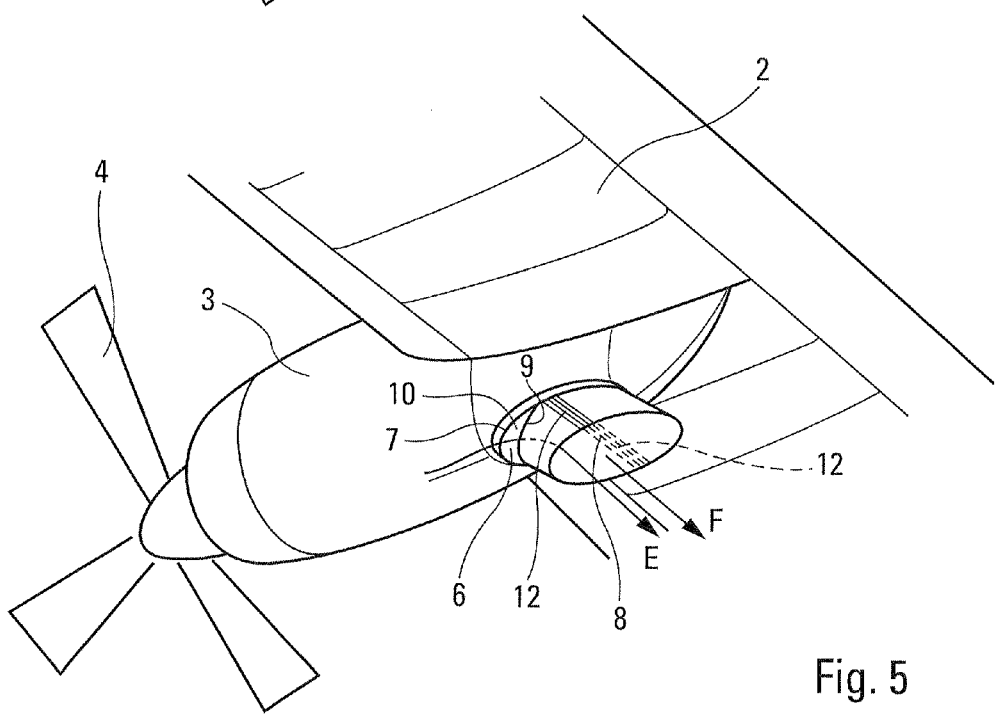

The tubular sleeve 8 can also assume, as illustrated in dotted lines on FIG. 2 and in perspective on FIG. 5, a projecting position in which it projects outwardly from said duct 6. In this projecting position, as illustrated by arrow E on FIGS. 2 and 5, the tubular sleeve 8 collects, when the plane is flying, a flow of outside fresh air in the vicinity of the turboprop 3 and mixes it with the hot flow F, so that, at the outlet of the sleeve 8, the mix being achieved has a temperature lower than that of said hot flow F.

Figure 3:
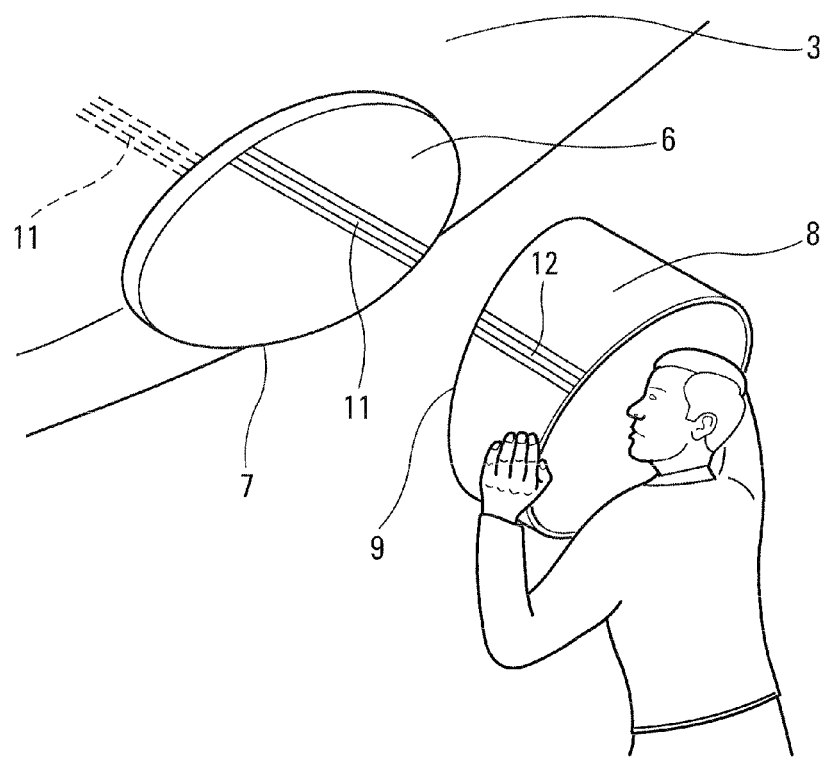
FIG. 3 schematically illustrates installing a tubular sleeve according to the invention into one of the turboprops.

As can be seen on FIGS. 2 and 3, the sleeve 8 has a whistle cut at its end 9 directed towards the nozzle 5. Thus, in a projecting position, a side opening 10 appears, directed to the front of the airplane 1, between the lower end 7 of the duct 6 and the slanted end 9 of the sleeve 8. This opening 10 acts in the same way as a scoop for introducing the outside fresh flow E inside the sleeve 8 and mixing the same with the hot flow F therein.

Figures 6, 7:
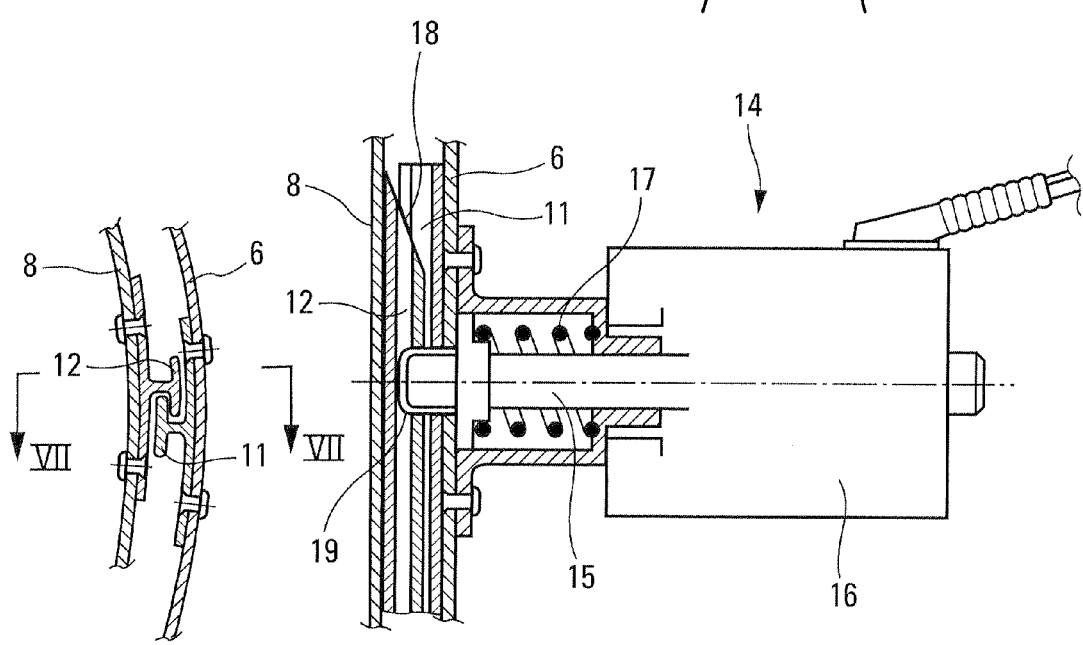
FIG. 6 shows, in a partial cross-section view, the cooperating slide system between said tubular sleeve and the hot flow discharge duct of the turboprop nozzle.
FIG. 7 shows, in a partial section at line VII-VII of FIG. 6, the latching means in position of said sleeve inside said duct.

Thanks to the cooperating longitudinal slides 11 and 12, mounted in the duct 6 and to the sleeve 8, respectively, the latter is slidably guided inside said duct (see in particular FIG. 6).

The sleeve 8, for example made of stainless steel sheet, can be loaded into the duct 6 in the manner illustrated on FIG. 6, by having the slides 12 of sleeve 8 cooperating with slides 11 of duct 6 and by pushing said sleeve 8 into said duct until latching means 14 automatically latch sleeve 8 into the inner position (FIG. 4).

The latching means 14 have a latch finger 15 actuated by an electromagnet 16 and elastically mounted with respect thereto through a compression spring 17 (FIG. 7).

Optionally, the front end of the slide 12 of the sleeve 8 has a bevel cut 18.

Thus, when loading the sleeve 8 into the duct 6, the bevel 18 reaches the latch finger 15, it pushed it back against the action of the spring 17, until the latter makes said latch finger 15 penetrate a notch 19 of said slide 12. Sleeve 8 is then latched into the inner position (FIG. 4) in the duct 6.

When, during a flight, it is useful to reduce the infrared signature of turboprop 3, the electromagnet 16 is controlled and retracts the latch finger 15 by making it come out the notch 19. Sleeve 8 can then switch from its inner position (FIG. 4) to its projecting position (FIG. 5) thanks to the combined action of gravity and the hot flow F.

Provided on the duct 6 are second latching means identical to first means 14 for automatically latching the sleeve 8 into the projecting position thereof, which is then labelled by a latch finger (identical to the finger 15) cooperating with a notch of the slide 12 (identical to the notch 19). For that purpose, the rear end of slide 12 can have a bevel similar to the bevel 18.

If, as schematically illustrated on FIG. 1, it is desired to release the sleeves 8 during a flight, the electromagnet of the second latching means is consequently controlled so as to retract the latch fingers thereof. The sleeves 8 can then slide down until they entirely come out of the ducts 6.

The invention claimed is:

1. A device for reducing infrared emissions at an outlet of a turboprop mounted to an aircraft, said outlet having, within said turboprop, a tubular duct which extends downwardly from a nozzle of said turboprop and through which hot gases flow off said nozzle, wherein said device has a tubular sleeve which is able to slide into said tubular duct while said hot gases flow therethrough and which can switch:

from an inner position, in which said tubular sleeve is entirely accommodated inside said tubular duct, to a projecting position, in which said tubular sleeve projects outwardly from said tubular duct and is able to collect a flow of outside fresh air and to mix said flow of outside fresh air thus collected with said gases flow coming from a turbine, in order to lower the temperature of the latter flow before the latter flow is discharged outside by said tubular sleeve.

2. The device according to claim 1, wherein said tubular sleeve has a side opening directed to the front of said aircraft and arranged, in a projecting position of said sleeve, in the vicinity of said turboprop.

3. The device according to claim 2, wherein said side opening results from the fact that the end of said tubular sleeve directed towards said nozzle is truncated slantwise.

4. The device according to claim 1, wherein said tubular sleeve and said tubular duct have cooperating slides in order to guide the sliding of said sleeve in said duct.

5. The device according to claim 1, wherein said tubular sleeve is removably inserted into said tubular duct.

6. The device according to claim 1, wherein said inner position of the sleeve is labelled by first latching means with automatic latching and controllable unlatching, integral with said tubular duct.

7. The device according to claim 1, wherein said projecting position of the sleeve is labelled by second latching means with automatic latching, integral with said tubular duct.

8. The device according to claim 7, wherein said second latching means are of the controllable unlatching type.

9. A turboprop for an aircraft, in which the outlet of the nozzle of said turboprop has an inner tubular duct which extends downwardly from said nozzle, wherein said inner tubular duct has slides able to cooperate with the slides mounted to the tubular sleeve of the device as set out according to claim 4.

10. A turboprop for an aircraft, in which the outlet of a nozzle of said turboprop has an inner tubular duct which extends downwardly from said nozzle, wherein said inner tubular duct has latching means able to latch, in a position inside said tubular duct, the tubular sleeve of the device as set out according to claim 6.

* * * * *